United States Patent
Valero et al.

(10) Patent No.: US 10,352,154 B2
(45) Date of Patent: Jul. 16, 2019

(54) METHODS AND APPARATUS TO PROCESS MEASUREMENTS ASSOCIATED WITH DRILLING OPERATIONS

(71) Applicant: Schlumberger Technology Corporation, Sugar Land, TX (US)

(72) Inventors: Henri-Pierre Valero, Kanagawa-ken (JP); Sandip Bose, Brookline, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 13/975,364

(22) Filed: Aug. 25, 2013

(65) Prior Publication Data
US 2013/0345984 A1 Dec. 26, 2013

Related U.S. Application Data (62) Division of application No. 12/685,633, filed on Jan. 11, 2010, now Pat. No. 8,554,483.

(51) Int. Cl.
*G01V 1/46* (2006.01)
*E21B 47/00* (2012.01)
(Continued)

(52) U.S. Cl.
CPC .............. *E21B 47/12* (2013.01); *E21B 47/00* (2013.01); *G01V 1/46* (2013.01); *G01V 11/00* (2013.01)

(58) Field of Classification Search
CPC ................................ E21B 15/00; E21B 47/12
(Continued)

(56) References Cited

U.S. PATENT DOCUMENTS 5,551,286 A * 9/1996 Booer .................. 73/152.45
6,237,404 B1 5/2001 Crary et al.
(Continued)

FOREIGN PATENT DOCUMENTS

| EP | 1002934 | 5/2000 |
| GB | 2424707 | 10/2006 |
| WO | 2007/149324 | 12/2007 |

OTHER PUBLICATIONS

P. Breton, et al., "Well Positioned Seismic Measurements," Oilfield Review, pp. 32-45, Spring, 2002.
(Continued)

*Primary Examiner* — Manuel L Barbee
*Assistant Examiner* — Raymond L Nimox (57) ABSTRACT

Methods and apparatus to process measurements associated with drilling operations are described. An example method of modifying processing results during a subterranean formation drilling operation includes identifying a plurality of parameters and processing measurements associated with the subterranean formation obtained while drilling and the plurality of parameters to generate first results. Additionally, the example method includes processing measurements associated with the subterranean formation obtained while drilling is temporarily suspended and the plurality of parameters to generate second results and comparing the first and second results. Further, the example method includes, in response to the comparison of the first and second results, modifying the first results based on the second results to improve a quality of the first results.

7 Claims, 8 Drawing Sheets

(51) Int. Cl.
*E21B 47/12* (2012.01)
*G01V 11/00* (2006.01)

(58) Field of Classification Search
USPC ............... 702/7, 182, 183, 184, 185, 188; 73/152.45
See application file for complete search history.

(56) References Cited

U.S. PATENT DOCUMENTS

| | | | |
|---|---|---|---|
| 6,308,137 | B1 | 10/2001 | Underhill et al. |
| 8,095,317 | B2* | 1/2012 | Ekseth et al. .............. 702/7 |
| 8,433,519 | B2* | 4/2013 | Ekseth et al. .............. 702/7 |
| 8,451,688 | B2* | 5/2013 | Yoneshima ............ G01V 1/42 367/56 |
| 8,554,483 | B2* | 10/2013 | Valero .................. E21B 47/00 702/7 |
| 2005/0036403 | A1* | 2/2005 | Leggett, III ............ G01V 1/44 367/32 |
| 2005/0205300 | A1* | 9/2005 | Mathiszik ............ E21B 47/026 175/48 |
| 2006/0239118 | A1 | 10/2006 | Guidry et al. |
| 2011/0058451 | A1* | 3/2011 | Yoneshima ............ G01V 1/42 367/31 |
| 2011/0172921 | A1* | 7/2011 | Valero ................... E21B 47/00 702/7 |

OTHER PUBLICATIONS

International Search Report and Written Opinion issued in International patent application PCT/IB2011/000011 dated Apr. 12, 2017. 10 pages.

International Preliminary Report on Patentability issued in International patent application PCT/IB2011/000011 dated Jul. 12, 2017. 6 pages.

* cited by examiner

FIG. 1

PRIOR ART

METHODS AND APPARATUS TO PROCESS MEASUREMENTS ASSOCIATED WITH DRILLING OPERATIONS

FIELD OF THE DISCLOSURE

This application is a divisional application of U.S. patent application Ser. No. 12/685,633, filed Jan. 11, 2010.

This patent relates generally to drilling operations and, more particularly, to methods and apparatus to process measurements associated with drilling operations.

BACKGROUND

During drilling operations, measurements may be obtained and processed while drilling or while drilling is temporarily suspended. The processed measurements or processing results may be used to obtain a better understanding of the formation being drilled. However, because measurements obtained while drilling may have relatively large amounts of noise, portions of the formation may be inaccurately or inadequately understood.

SUMMARY

An example method of modifying processing results during a subterranean formation drilling operation includes identifying a plurality of parameters and processing measurements associated with the subterranean formation obtained while drilling and the plurality of parameters to generate first results. Additionally, the example method includes processing measurements associated with the subterranean formation obtained while drilling is temporarily suspended and the plurality of parameters to generate second results and comparing the first and second results. Further, the example method includes, in response to the comparison of the first and second results, modifying the first results based on the second results to improve a quality of the first results.

An example drillstring includes a measurement device to measure one or more parameters and a processor to process the one or more measured parameters and one or more processing parameters to generate results. Additionally, the example drillstring includes an apparatus to link results generated during a first time interval and results generated during a second time interval.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The example methods and apparatus described herein can be used to process measurements associated with a drilling operation by utilizing a prediction operation or apparatus to perform quality control on results obtained while drilling, to set or determine processing parameters and/or to constrain logs forwards and/or to refine logs backwards. Thus, the example methods and apparatus described herein may be used to improve or optimize the use of measurements and/or the processing of such measurements associated with a drilling operation.

To perform quality control on the results obtained while drilling, the prediction operation or apparatus may utilize measurements or results of processing such measurements obtained while drilling is temporarily suspended to identify measurements or results obtained while drilling that are not substantially associated with noise. For example, if the measurements or processing results are associated with peaks with respect to slowness in a slowness time coherence map (e.g., slowness peaks), the prediction operation or apparatus may link slowness peaks having a relatively high coherence and obtained while drilling and while drilling is temporarily suspended. Slowness peaks having a relatively high coherence are not substantially associated with noise. Thereafter, the linked slowness peaks may be advantageously utilized to produce logs that more accurately represent the formation.

Figure 1:
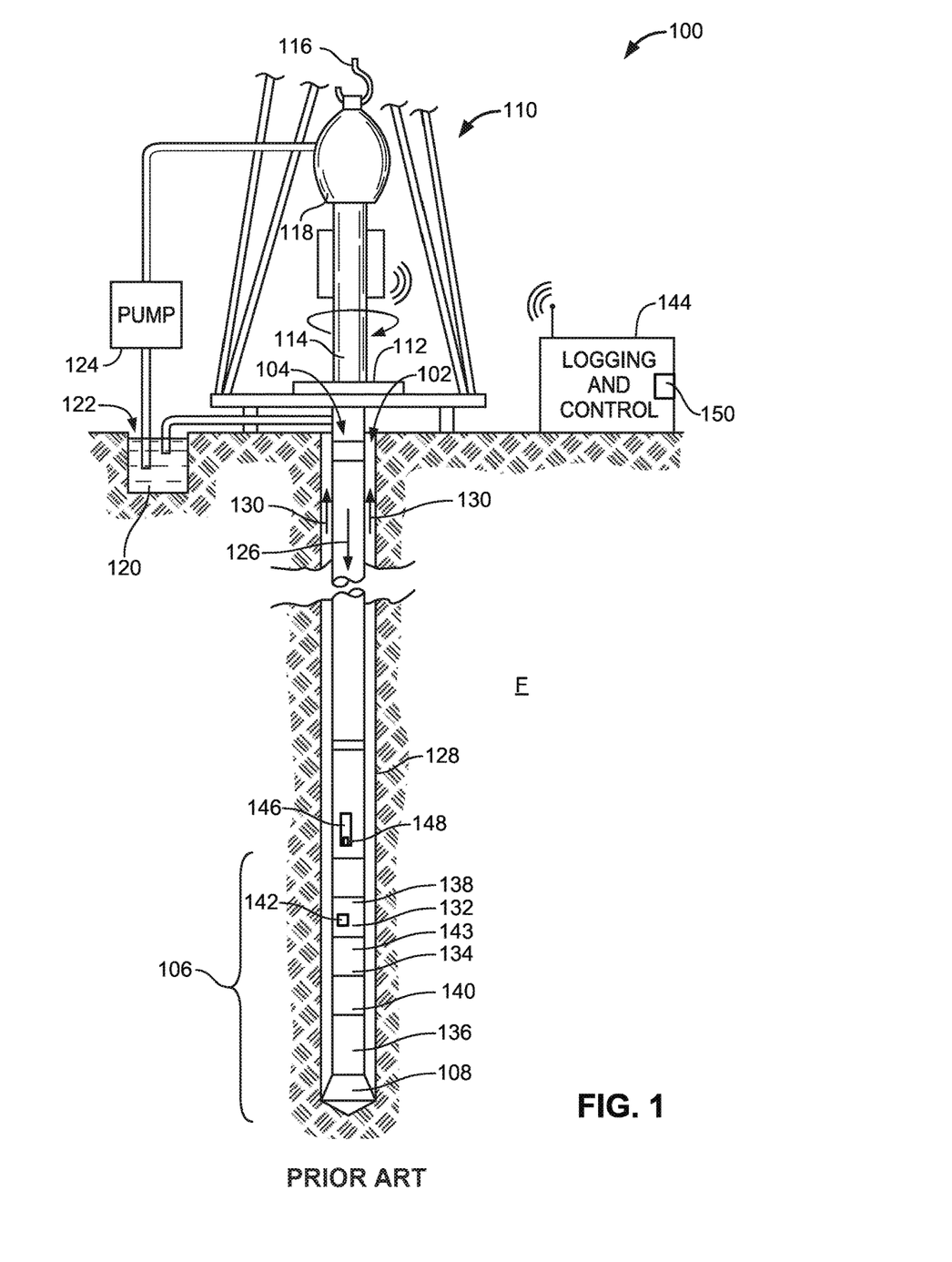
FIG. 1 depicts an example wellsite drilling system.

FIG. 1 illustrates a wellsite system 100 in which the examples described herein can be employed. The wellsite system 100 can be onshore or offshore. In this example, a borehole 102 is formed in a subsurface formation F by rotary drilling. However, directional drilling may also be used.

A drillstring 104 is suspended within the borehole 102 and has a bottomhole assembly 106 that includes a drill bit 108 at its lower end. At the surface, the wellsite system 100 includes a platform and derrick assembly 110 positioned over the borehole 102. The platform and derrick assembly 110 includes a rotary table 112, a kelly 114, a hook 116 and a rotary swivel 118. The rotary table 112 may engage the kelly 114 at an upper end of the drillstring 104 to impart rotation to the drillstring 104. The rotary table 112 may be energized by a device or system not shown. The drillstring 104 is suspended from the hook 116 that is attached to a traveling block (also not shown). Additionally, the drillstring 104 is positioned through the kelly 114 and the rotary swivel 118, which permits rotation of the drillstring 104 relative to the hook 116. Additionally or alternatively, a top drive system may be used to impart rotation to the drillstring 104.

In the example depicted in FIG. 1, at the surface, the wellsite system 100 includes drilling fluid or mud 120 that may be stored in a pit 122 formed at the wellsite. A pump 124 delivers the drilling fluid 120 to the interior of the drillstring 104 via a port in the rotary swivel 118, causing the drilling fluid 120 to flow downwardly through the drillstring 104 as indicated by the directional arrow 126. The drilling fluid 120 exits the drillstring 104 via ports in the drill bit 108, and then circulates upwardly through the annulus region between the outside of the drillstring 104 and a wall 128 of the borehole 102 as indicated by the directional arrows 130.

The drilling fluid 120 lubricates the drill bit 108 and carries formation cuttings up to the surface as the drilling fluid 120 is returned to the pit 122 for recirculation.

The bottomhole assembly 106 of the example illustrated in FIG. 1 includes a logging-while-drilling (LWD) module 132, a measuring-while-drilling (MWD) module 134, another drillstring component 136 such as, a roto-steerable system or mud motor, and the drill bit 108.

The LWD module 132 may be housed in a drill collar 138 and may include one or more logging tools. In some examples, the bottomhole assembly 106 may include an additional LWD module and/or a MWD module as represented by reference numeral 140. As such, references throughout this description to reference numeral 132 may additionally or alternatively include reference numeral 140. The LWD module 132 may include capabilities for measuring, processing, and storing information, as well as for communicating with the surface equipment. Additionally or alternatively, the LWD module 132 may include a seismic measuring device 142.

The MWD module 134 may be also housed in a drill collar 143 and can include one or more devices for measuring characteristics of the drillstring 104 and/or the drill bit 108. Additionally or alternatively, the MWD module 134 may include an apparatus (not shown) for generating electrical power for at least portions of the bottomhole assembly 106, for example. The apparatus for generating electrical power may include a mud turbine generator powered by the flow of drilling fluid. However, other power and/or battery systems may additionally or alternatively be employed. The MWD module 134 may include one or more tools or measuring devices such as, for example, a weight-on-bit measuring device, a torque measuring device, a vibration measuring device, a shock measuring device, a stick slip measuring device, a direction measuring device and/or an inclination measuring device.

A logging and control computer 144 and/or a controller 146 may process measurement data, parameters and/or information obtained during a drilling operation (e.g., while drilling and/or while drilling is temporarily suspended) using one or more processing parameters to obtain results (e.g., a log of slowness peaks versus depth). The processing may involve semblance processing, dispersion analysis, wave separation and/or automatic filtering among other processing techniques and the results of this processing may be associated with or be used to produce slowness logs or dispersion curves, for example. The processing parameters may be associated with formation slowness for P and S waves, formation density, drilling fluid slowness, drilling fluid density, borehole diameter, estimated arrival times of different waves and/or local knowledge of the formation, for example. Some of the measurement data may include formation compressional slowness, formation shear slowness, resistivity measurements, nuclear magnetic resonance (NMR) measurements, a slowness time coherence map, velocity versus frequency among other types of measurement data and/or measurements associated with formation evaluation.

During drilling operations, processing conducted while drilling (e.g., during a first time interval) may produce results having relatively large amounts of noise and processing conducted while drilling is temporarily suspended (e.g., during a second time interval) such as, when additional drillpipe is added to the drillstring, may produce results having relatively small amounts of noise. To enable the examples described herein to identify useful (e.g., relatively accurate) information from the processing results obtained while drilling, to predict processing results while drilling and/or to optimize the processing results, the logging and control computer 144 and/or the controller 146 may be provided with a Kalman filter, a recursive filter, a particle filter or any other suitable device (e.g., an apparatus to implement a prediction operation) 148 or 150. The Kalman filter 148 and/or 150 may utilize the processing results obtained while drilling is temporarily suspended to identify results within the processing results obtained while drilling that are not substantially associated with noise, thereby effectively constraining the processing results obtained while drilling. If any of the processing results (e.g., the processing results obtained while drilling) are identified as being inaccurate, such processing results may be corrected (e.g., modified, refined) by the amount of error identified (e.g., smoothed back) or such results may be flagged for later analysis.

Identifying the processing results obtained while drilling that are not substantially associated with noise may be accomplished by selectively associating and/or linking the processing results obtained while drilling is temporarily suspended and the processing results obtained while drilling, for example. The processing results may be associated with slowness peaks. In such examples, by linking slowness peaks having relatively high coherence, slowness peaks obtained while drilling that are not substantially associated with noise may be identified. Thereafter, the linked slowness peaks may be advantageously utilized to produce logs that more accurately represent the formation. The results may be presented versus depth in a slowness time (ST) projection. In other examples, the processing results may be associated with slowness at different frequencies. In such examples, by identifying results having relatively high coherence at a particular frequency, results obtained while drilling that are not substantially associated with noise may be identified. Using such an approach, slowness may be determined and plotted for different frequencies to produce dispersion curves.

The Kalman filter 148 and/or 150 may utilize the processing results obtained while drilling is temporarily suspended to estimate or predict processing results (e.g., future processing results, past processing results) obtained while drilling, for example. Such an approach, may be advantageously utilized to constrain, modify and/or refine processing results or logs generated using the examples described herein backwards (e.g., previous or past results) and forward (e.g., future results) to improve a quality and/or characteristic of the processing results obtained while drilling, for example. Additionally or alternatively, the processing results obtained while drilling is temporarily suspended may be utilized to update or modify the processing parameters (e.g., the borehole diameter, the drilling fluid density, etc.) if the previous parameters are no longer applicable and/or the processing results obtained while drilling is temporarily suspended are different than the processing results obtained while drilling or are different than previous processing results obtained while drilling was temporarily suspended. In some examples, if the processing results obtained while drilling is temporarily suspended in a second silent zone are different from previous processing results obtained while drilling is temporarily suspended in a first silent zone, the processing results obtained in the second silent zone may be utilized to predict previous processing results and/or to correct for errors in (e.g., smooth back) processing results between the first and second silent zones.

The processing results obtained while drilling, while drilling is temporarily suspended and/or predicted by the Kalman filter 148 and/or 150 may be utilized by the logging and control computer 144 and/or the controller 146 to generate log(s). The log(s) may be a slowness log versus depth, cross-logs and/or real-time logs, for example. In some examples, one of the logs may be a silent log generated using the processing results obtained while drilling is temporarily suspended. The silent log may have relatively high quality and a vertical resolution associated with an interval (e.g., 60 feet, 90 feet) drilled before additional drillpipe is added to the drillstring. Additionally or alternatively, one of the logs may be a noisy log generated using the processing results obtained while drilling. The noisy log may have a relatively fine vertical resolution and have questionable or challenging quality at times. Additionally or alternatively, one of the logs may be a predicted log generated using the processing results obtained while drilling is temporarily suspended in conjunction with the Kalman filter 148 and/or 150. Any or all of these logs may be compared by, for example, overlaying the logs to identify similarities and/or differences and/or to identify portions of the noisy log associated with noise and/or that dramatically depart from the silent log and/or the predicted log.

The logging and control computer 144 may receive information and/or data transmitted from the LWD module 132, the seismic measuring device 142 and/or the MWD module 134. The logging and control computer 144 may analyze results obtained while drilling and while drilling is temporarily suspended. The logging and control computer 144 may include a user interface that enables parameters (e.g., processing parameters) to be input and/or outputs to be displayed. While the logging and control computer 144 is depicted uphole and adjacent the wellsite system, a portion or the entire logging and control computer 144 may be positioned in the drillstring 104, the bottomhole assembly 106 and/or in a remote location.

Although the components of FIG. 1 are shown and described as being implemented in a particular conveyance type, the example methods and apparatus described herein are not limited to a particular conveyance type but, instead, may be implemented in connection with different conveyance types including, for example, coiled tubing, wireline, wired drillpipe, and/or any other conveyance types known in the industry.

Figure 2:
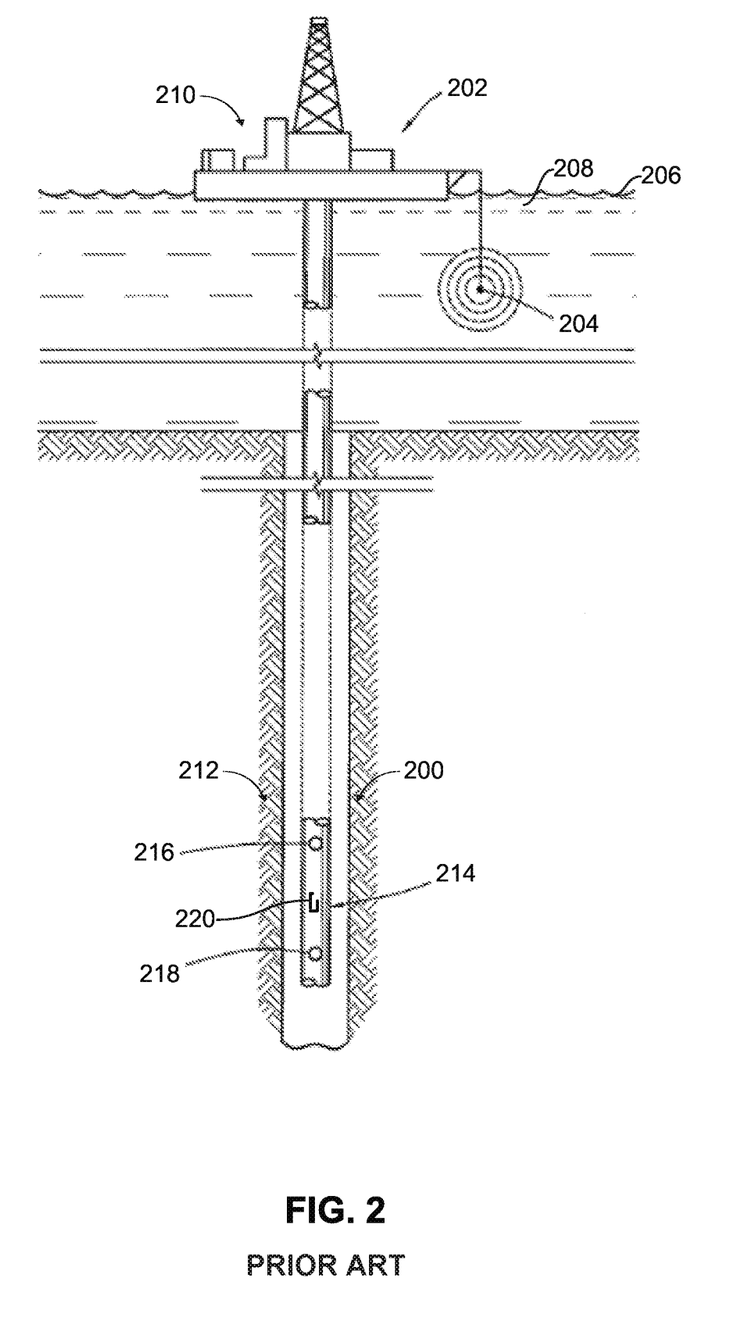
FIG. 2 depicts an example sonic logging-while-drilling tool.

FIG. 2 depicts a sonic logging-while-drilling tool 200 that may be used to implement at least a part of the LWD module 132 of FIG. 1 or may be part of the LWD module 140 as described in U.S. Pat. No. 6,308,137, which is hereby incorporated herein by reference in its entirety. An offshore rig 202 having a sonic transmitting source or array or transmitter 204 may be deployed near a surface 206 of water 208. Additionally or alternatively, any other type of uphole or downhole source or transmitter may be provided to transmit sonic signals. In some examples, an uphole processor (not shown) may control the firing of the transmitter 204.

Uphole equipment 210 may also include acoustic receivers (not shown) and a recorder (not shown) for capturing reference signals near the source of the signals (e.g., the transmitter 204). The uphole equipment 210 may also include telemetry equipment (not shown) for receiving MWD signals from downhole equipment 212. The telemetry equipment and the recorder are typically coupled to a processor (not shown) so that recordings may be synchronized using uphole and downhole clocks (not shown). In this example, a downhole LWD module 214 includes one or more acoustic receivers 216 and 218. The acoustic receivers 216 and 218 are typically coupled to a signal processor 220 so that recordings may be made of signals detected by the receiver(s) 216 and/or 218 in synchronization with the firing of the signal source (e.g., the transmitter 204).

Figure 4:
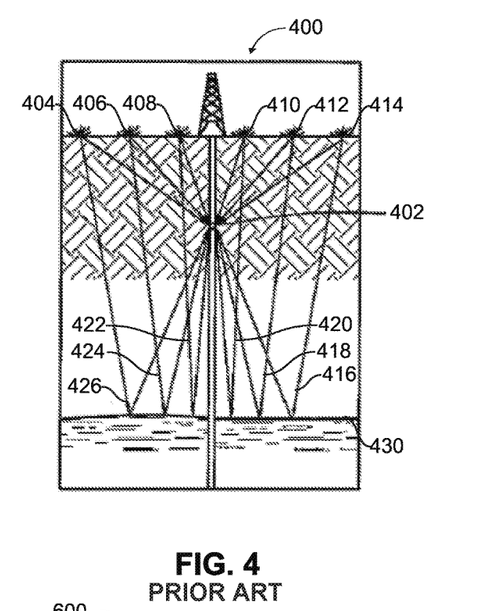
Figure 5:
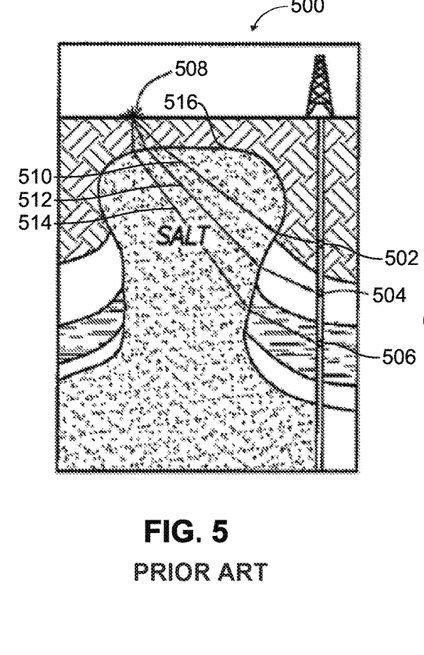
Figure 6:
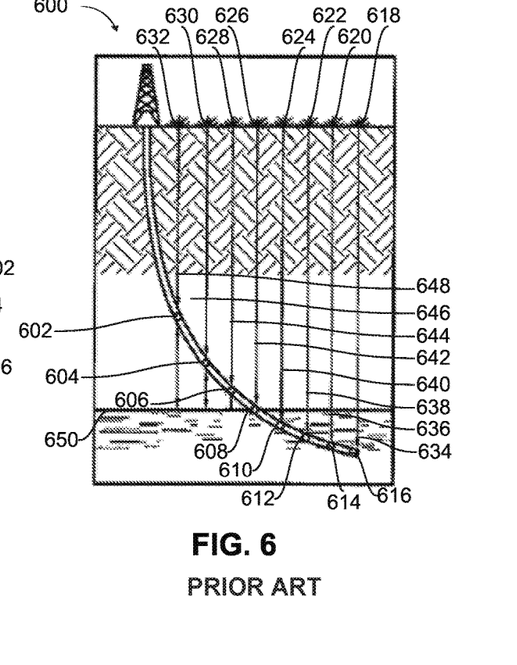

FIGS. 3-6 illustrate seismic-while-drilling tools 300, 400, 500 and/or 600 that may be used to implement at least a part of the LWD module 132 of FIG. 1 or may be part of the LWD module 140 as described in P. Breton et al., "Well Positioned Seismic Measurements," Oilfield Review, pp. 32-45, Spring, 2002, which is hereby incorporated herein by reference in its entirety. The seismic-while-drilling tools 300, 400, 500 and 600 may include a single receiver 302 (FIG. 3) and 402 (FIG. 4) or a plurality of receivers 502-506 (FIG. 5), 602-616 (FIG. 6) that may be employed in conjunction with a single seismic source or transmitter 304 (FIG. 3), 508 (FIG. 5) or a plurality of seismic sources or transmitters 404-414 (FIG. 4) or 618-632 (FIG. 6).

Figure 3:
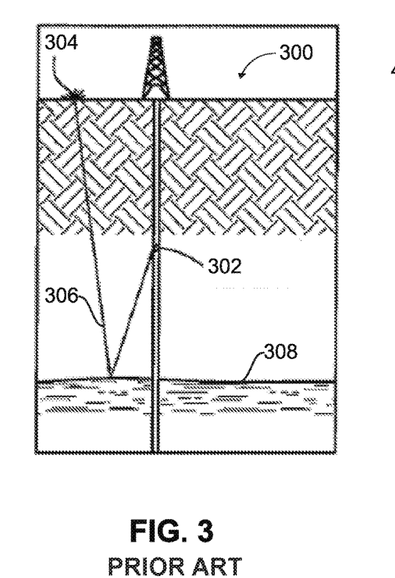
FIGS. 3-6 depict sonic while drilling tools having one or more seismic sources and one or more receivers.

FIG. 3 depicts a signal 306 reflecting off of a bed boundary 308 and may be referred to as a "zero-offset" vertical seismic profile arrangement. FIG. 4 depicts signals 416-426 reflecting off of a bed boundary 430 and may be referred to as a "walkaway" vertical seismic profile arrangement. FIG. 5 depicts signals 510-514 refracting through salt dome boundaries 516 and may be referred to as "salt proximity" vertical seismic profile. FIG. 6 depicts signals 634-648 some of which are reflecting off of a bed boundary 650 and may be referred to as "walk above" vertical seismic profile.

Figure 7:
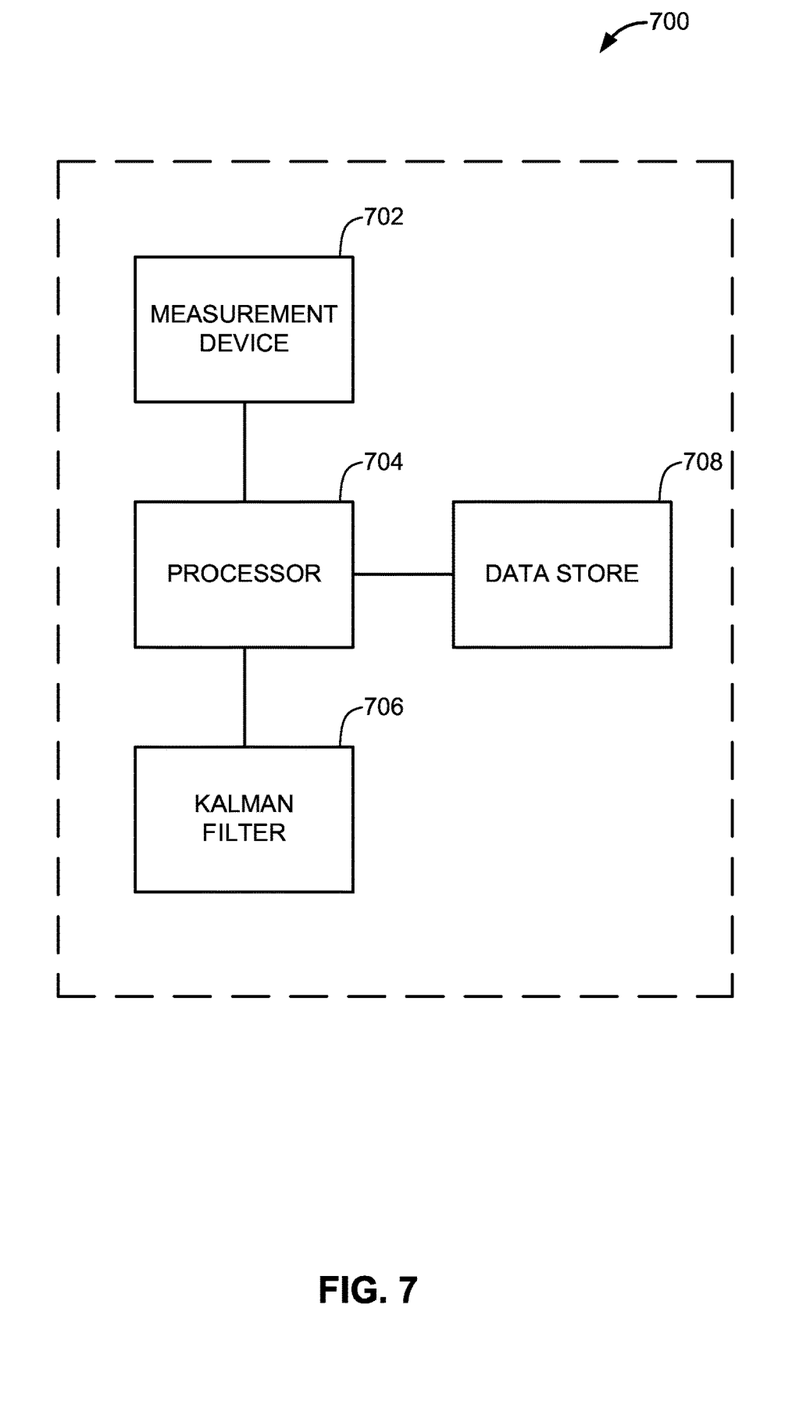
FIG. 7 depicts an example apparatus that may be used to implement the examples described herein.

FIG. 7 depicts an example apparatus 700 that may be used to implement a portion of the seismic measuring device 142 (FIG. 1), the LWD module 132 (FIG. 1), the logging and control computer 144 (FIG. 1), the controller 146 (FIG. 1), the Kalman filter 148 and/or 150 (FIG. 1), the sonic logging-while-drilling tool 200 (FIG. 2) and/or any of the seismic-while-drilling tools 300 (FIG. 3), 400 (FIG. 4), 500 (FIG. 5) and/or 600 (FIG. 6). The apparatus 700 may include a measurement device 702, a processor 704, a Kalman filter, a recursive filter, a particle filter or any other suitable device (e.g., an apparatus to implement a prediction operation) 706 and a data store 708, all or some of which may be communicatively coupled together. The apparatus 700 may be positioned entirely downhole or partially downhole and partially uphole, for example.

To measure parameters and/or quantities related to formation properties, the apparatus 700 is provided with the measurement device 702. The measurement device 702 may measure formation compressional slowness, formation shear slowness, resistivity measurements, nuclear magnetic resonance (NMR) measurements, a slowness time coherence map, velocity versus frequency among other measurements associated with formation evaluation.

To process the measurement data, parameters and/or information obtained during a drilling operation along with one or more processing parameters, the apparatus 700 includes the processor 704. The processor 704 may process measurements while drilling or while drilling is temporarily suspended. However, processing conducted while drilling (e.g., during a first time interval) may produce results having a first amount of noise (e.g., a relatively large amount of noise) and processing conducted while drilling is temporarily suspended (e.g., during a second time interval) such as, when additional drillpipe is added to the drillstring, may produce results having a second amount of noise (e.g., a relatively small amount of noise).

Prior to initiating a drilling operation and/or when more up-to-date information becomes available, processing parameters may be input into the logging and control computer 144, stored in the data store 708 and/or updated or changed based on processing results, for example. The processing parameters may be associated with formation slowness for P and S waves, formation density, drilling fluid slowness, drilling fluid density, borehole diameter, estimate time arrival of different waves and/or local knowledge of the formation. As described above, processing may include semblance processing, dispersion analysis, wave separation and/or automatic filtering among other types of processing.

To identify useful (e.g., relatively accurate) information from the processing results obtained while drilling and/or to predict processing results while drilling, the apparatus 700 may be provided with the Kalman filter 706. The Kalman filter 706 may utilize the processing results obtained while drilling is temporarily suspended to identify results within the processing results obtained while drilling that are not substantially associated with noise. Identifying results within the processing results obtained while drilling that are not substantially associated with noise may be accomplished by comparing (e.g., similarities and differences) between the processing results obtained while drilling is temporarily suspended and the processing results obtained while drilling, for example. If portions of the processing results obtained while drilling are relatively similar to the processing results obtained while drilling is temporarily suspended, then these portions of the processing results obtained while drilling may not be substantially associated with noise.

The Kalman filter 706 may utilize the processing results obtained while drilling is temporarily suspended to predict processing results (e.g., future processing results, previous or past processing results) obtained while drilling. Additionally or alternatively, the processing results obtained while drilling is temporarily suspended may be utilized to update or modify the processing parameters (e.g., the borehole diameter, the drilling fluid density, etc.) if the processing results obtained while drilling are different from the processing results obtained while drilling is temporarily suspended, for example.

Figure 8:
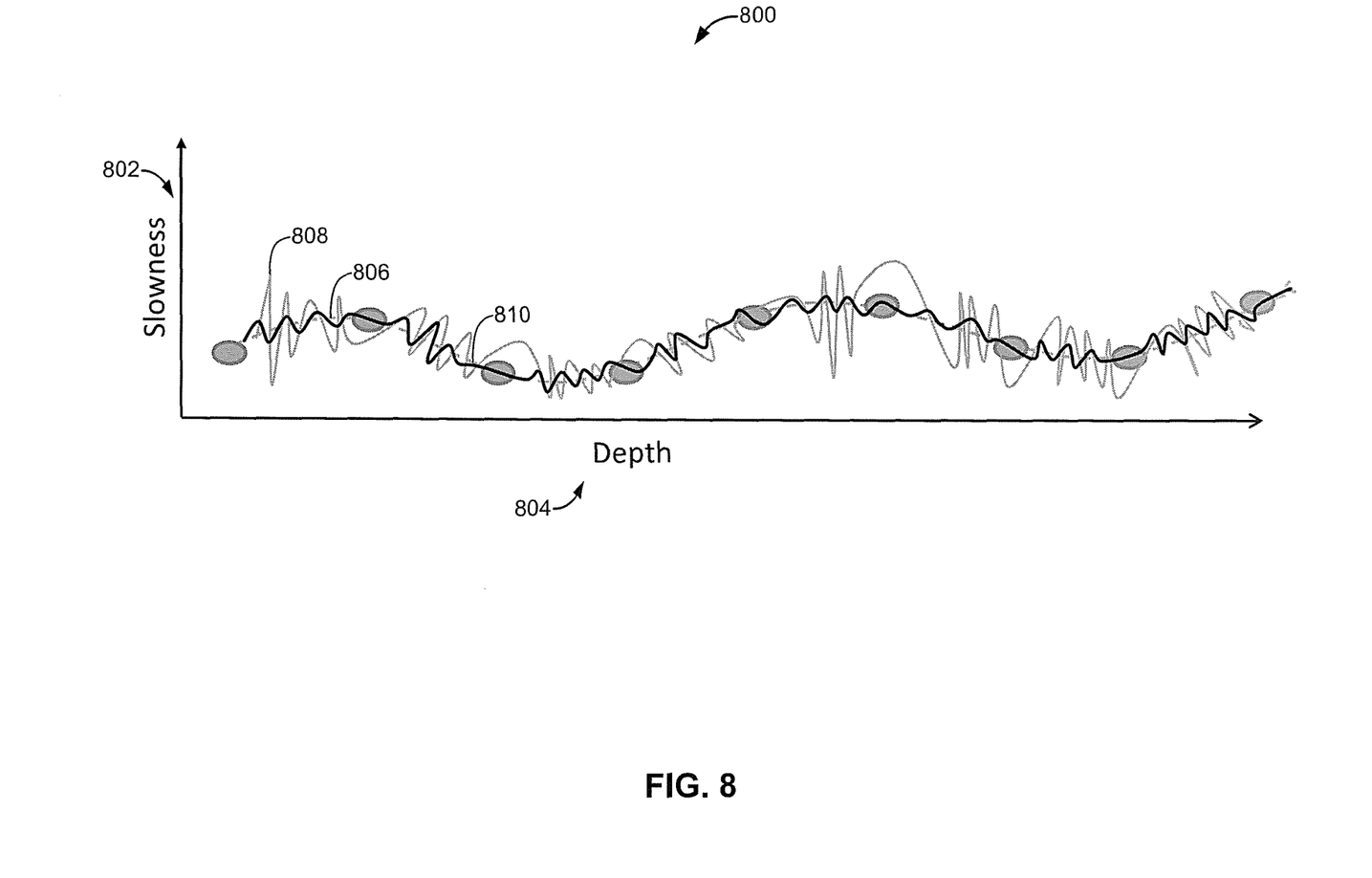
FIG. 8 depicts an example graph of processing results obtained using the examples described herein.

Turning to FIG. 8, the processing results obtained while drilling, while drilling is temporarily suspended and/or predicted by the Kalman filter 706 may be utilized by the processor 704 (FIG. 7) to generate log(s) represented by graph 800. The y-axis 802 of the graph 800 may be associated with slowness and the x-axis 804 of the graph 800 may be associated with depth. In this example, the graph includes a first log 806, a second log 808 and a third log 810. The first log 806 may be a silent log generated using the processing results obtained while drilling is temporarily suspended. The second log 808 may be a noisy log generated using the processing results obtained while drilling. The third log 810 may be a predicted log generated using the processing results obtained while drilling is temporarily suspended in conjunction with the Kalman filter 706.

Figure 9:
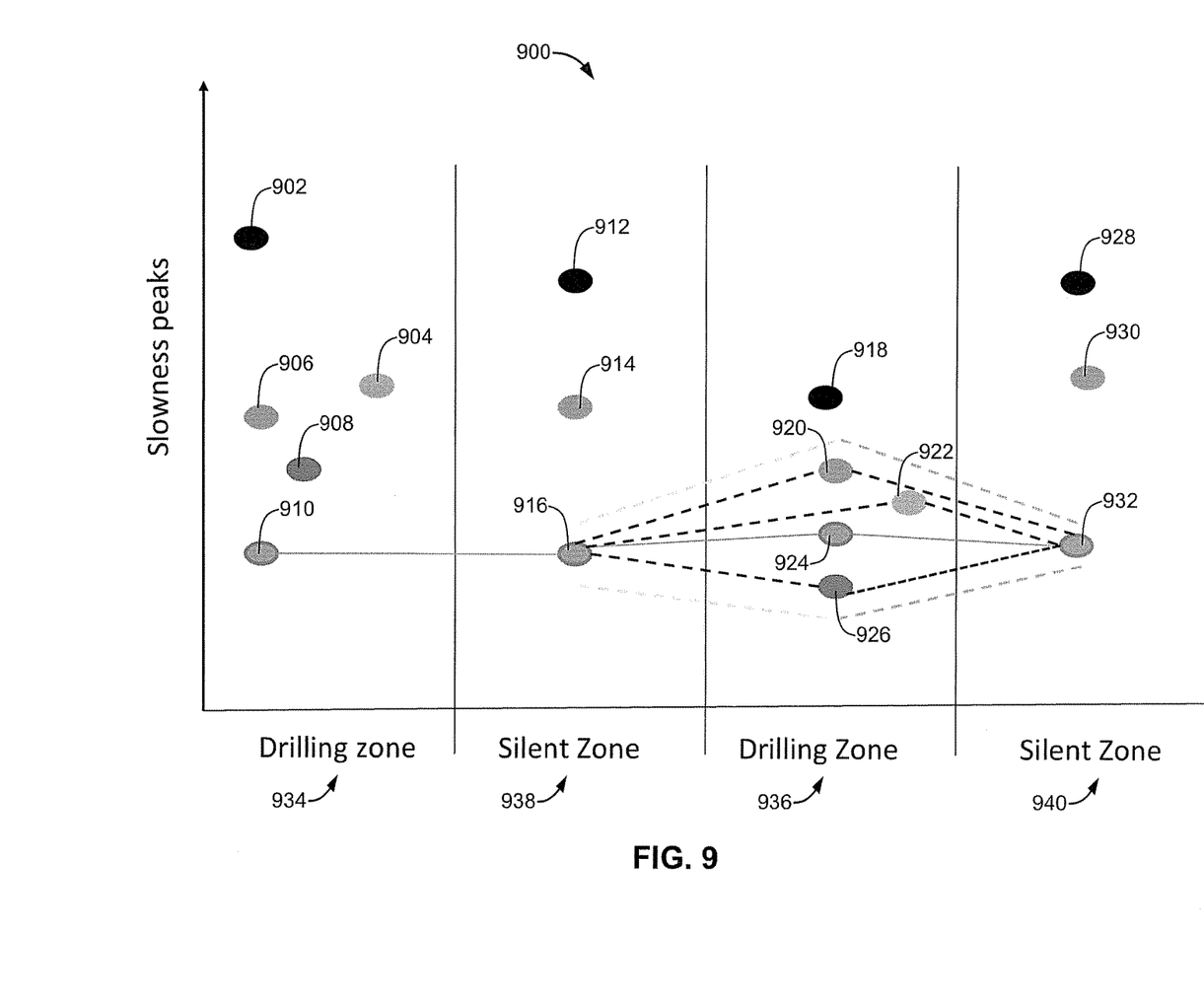
FIG. 9 depicts a plot of processing results obtained using the examples described herein.

FIG. 9 depicts a plot 900 of slowness peaks 902-932 obtained in drilling zones (i.e., while drilling) 934 and 936 and silent zones (i.e., while drilling is temporarily suspended) 938 and 940. Some of the peaks in the drilling zone 934 and/or 936 are due to noise. Therefore, to select the slowness peak(s) in the drilling zone 934 and/or 936 that is not substantially associated with noise, the Kalman filter 148, 150 and/or 706 may selectively associate and/or link the slowness peak 916 in the silent zone 938 with one of the slowness peaks 920-926 in the drilling zone 936 that is substantially coherent, for example. By comparing the slowness peaks 916 and 920-926, the Kalman filter 148, 150 and/or 706 may identify high coherence between the slowness peaks 916 and 924 and that the slowness peaks 920, 922 and 926 are due to noise. Additionally, the Kalman filter 148, 150 and/or 706 may link the slowness peak 932 in the silent zone 940 with one of the slowness peaks 920-926 in the drilling zone 936 that is substantially coherent, for example. By comparing the slowness peaks 932 and 920-926, the Kalman filter 148, 150 and/or 706 may identify high coherence between the slowness peaks 924 and 932 and that the slowness peaks 920, 922 and 926 are due to noise. By linking the processing results not substantially associated with noise, more accurate representations of the formation may be obtained and/or generated.

Figure 10:
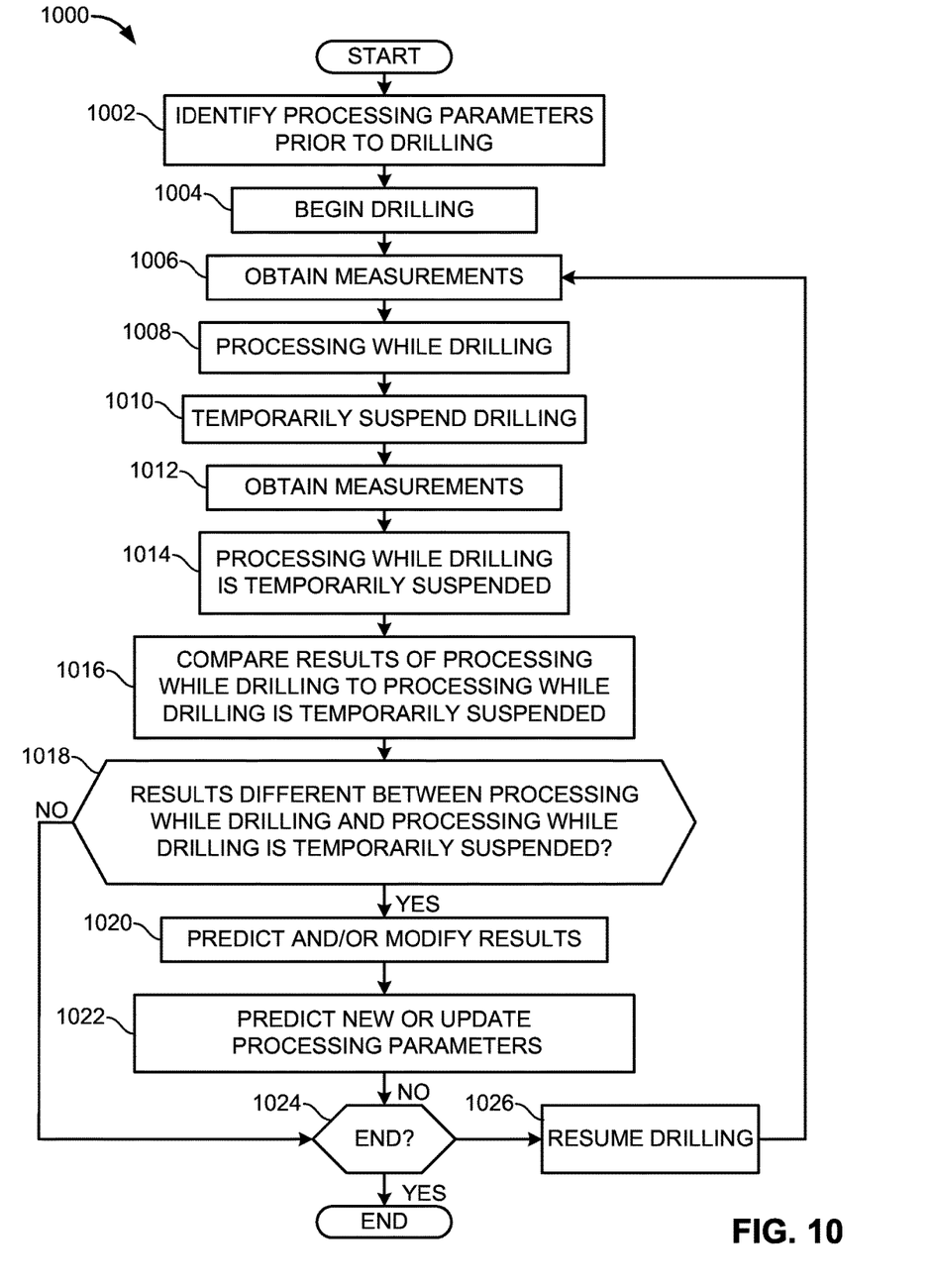
FIG. 10 is a flowchart of an example method that may be used to implement the examples described herein.

FIG. 10 is a flowchart of an example method 1000 that can be used in conjunction with the example apparatus described herein to identify useful (e.g., relatively accurate) information from the processing results obtained while drilling and/or to predict processing results while drilling, for example. The example method 1000 of FIG. 10 may be used to implement the seismic measuring device 142 (FIG. 1), the LWD module 132 (FIG. 1), the logging and control computer 144 (FIG. 1), the controller 146 (FIG. 1), the Kalman filter 148 and/or 150 (FIG. 1), the sonic logging-while-drilling tool 200 (FIG. 2), any of the seismic-while-drilling tools 300 (FIG. 3), 400 (FIG. 4), 500 (FIG. 5), 600 (FIG. 6) and/or the apparatus 700 (FIG. 7). The example method 1000 of FIG. 10 may be implemented using software and/or hardware. In some example implementations, the flowchart can be representative of example machine readable instructions, and the example method 1000 of the flowchart may be implemented entirely or in part by executing the machine readable instructions. Such machine readable instructions may be executed by the logging and control computer 144 (FIG. 1), the controller 146 (FIG. 1) and/or the processor 704 (FIG. 7), for example.

In particular, a processor or any other suitable device to execute machine readable instructions may retrieve such instructions from a memory device (e.g., a random access memory (RAM), a read only memory (ROM), etc.) and execute those instructions. In some example implementations, one or more of the operations depicted in the flowchart of FIG. 10 may be implemented manually. Although the example method 1000 is described with reference to the flowchart of FIG. 10, persons of ordinary skill in the art will readily appreciate that other methods to implement the seismic measuring device 142 (FIG. 1), the LWD module 132 (FIG. 1), the logging and control computer 144 (FIG. 1), the controller 146 (FIG. 1), the Kalman filter 148 and/or 150 (FIG. 1), the sonic logging-while-drilling tool 200 (FIG. 2), any of the seismic-while-drilling tools 300 (FIG. 3), 400 (FIG. 4), 500 (FIG. 5), 600 (FIG. 6) and/or the apparatus 700 (FIG. 7) may additionally or alternatively be used. For example, the order of execution of the blocks depicted in the flowchart of FIG. 10 may be changed and/or some of the blocks described may be rearranged, eliminated, or combined.

The method 1000 may begin by identifying one or more processing parameters prior to drilling (block 1002). Some of the processing parameters may include or be associated with formation slowness for P and S waves, formation density, drilling fluid slowness, drilling fluid density, borehole diameter, estimated arrival times of different waves and/or local knowledge of the formation, for example. The processing parameters may be input or set using the logging and control computer 144.

The method 1000 may then begin drilling (block 1004) through the formation. As the drilling operation takes place, measurements may be obtained (block 1006) relating to formation parameters and/or quantities related to formation properties. In some examples, the seismic measuring device 142 may be utilized to obtain at least some of the measurements. Some of the measurements and/or formation parameters may be associated with formation compressional slowness, formation shear slowness, resistivity measurements, nuclear magnetic resonance (NMR) measurements, a slowness time coherence map, velocity versus frequency and/or measurements associated with formation evaluation.

The method 1000 may then perform processing while drilling (block 1008). Specifically, measurements along with the processing parameters may be processed to obtain first results. The processing may include semblance processing, dispersion analysis, wave separation and/or automatic filtering and may be conducted using the logging and control computer 144 (FIG. 1), the controller 146 (FIG. 1) and/or the processor 704 (FIG. 7), for example. Processing that takes place while drilling may include relatively large amounts of noise. The method 1000 may then temporarily suspend drilling (block 1010) to add additional drillpipe to the drillstring, for example. While drilling is temporarily suspended, measurements may be obtained (block 1012) that may be similar to the measurements obtained while drilling. The measurements may then be processed (block 1014) along with the processing parameters to obtain second results. Processing results obtained while drilling is temporarily suspended may include relatively small amounts of noise.

The method 1000 may then compare the results of processing while drilling (e.g., the first results) to the results of processing while drilling is temporarily suspended (e.g., the second results) (block 1016) using the logging and control computer 144 (FIG. 1), the controller 146 (FIG. 1) and/or the processor 704 (FIG. 7). The method 1000 then determines if there is a difference between the processing results obtained while drilling and the processing results obtained while drilling is temporarily suspended (block 1018). If there is no difference between the processing results, control advances to block 1024. However, if there is a difference between the processing results, control advances to block 1020.

If there is a difference between the processing results, the method 1000 may predict, modify and/or refine the results obtained while drilling using the Kalman filter 148 and/or 150 (FIG. 1) and/or 706 (FIG. 7) (block 1020). For example, the method 1000 may utilize the processing results obtained while drilling is temporarily suspended to identify results within the processing results obtained while drilling that are not substantially associated with noise by comparing the processing results obtained while drilling is temporarily suspended and the processing results obtained while drilling. Additionally or alternatively the method 1000 may utilize the processing results obtained while drilling is temporarily suspended to predict processing results (e.g., future processing results, previous processing results) obtained while drilling.

The method 1000 may then predict new or update the processing parameters based, at least in part, on the processing results obtained while drilling is temporarily suspended (block 1022). The method 1000 then determines whether it should resume drilling (block 1024). If the method 1000 determines that it should resume drilling, control advances to block 1026 and thereafter to block 1006, otherwise the example method 1000 is ended.

Figure 11:
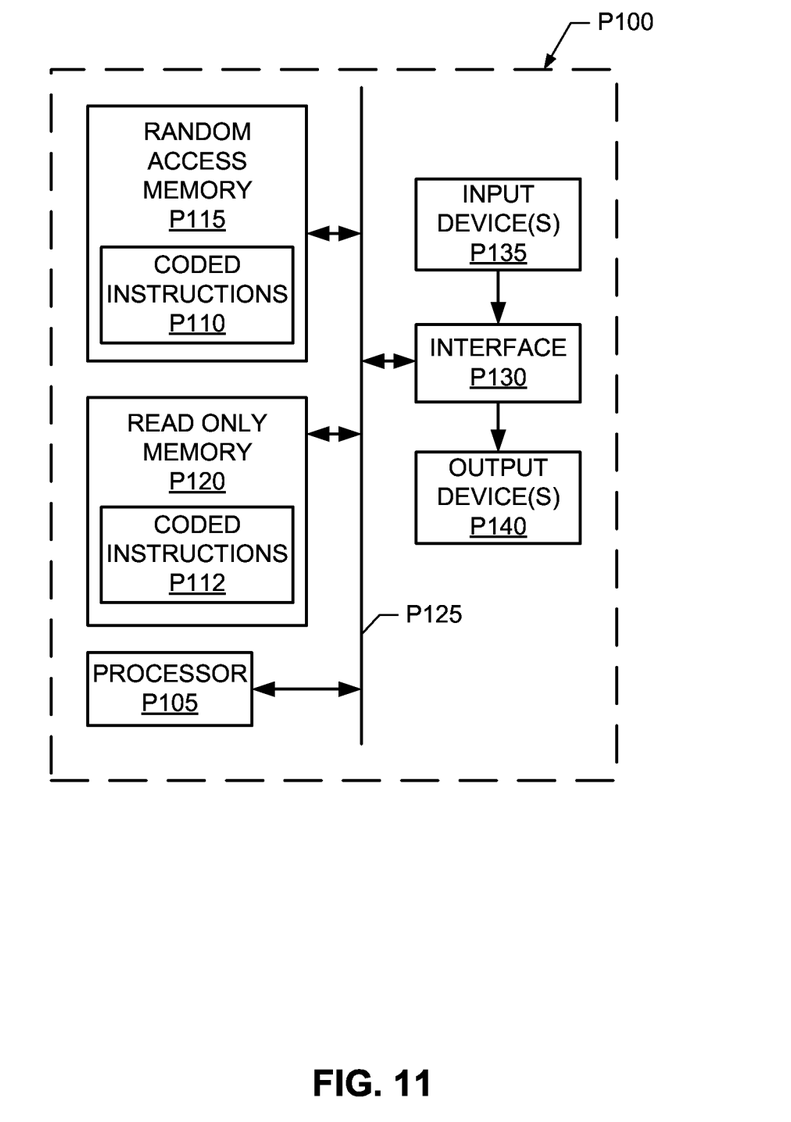
FIG. 11 is a schematic illustration of an example processor platform that may be used and/or programmed to implement any or all of the example methods and apparatus described herein.

FIG. 11 is a schematic diagram of an example processor platform P100 that may be used and/or programmed to implement to implement the logging and control computer 144 (FIG. 1), the controller 146 (FIG. 1) and/or the processor 704 (FIG. 7). For example, the processor platform P100 can be implemented by one or more general purpose processors, processor cores, microcontrollers, etc.

The processor platform P100 of the example of FIG. 11 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown).

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130.

The examples described herein can be used to identify accurate processing results generated during a drilling operation by utilizing a prediction operation or apparatus. Specifically, by utilizing a prediction operation or apparatus in conjunction with processing results generated while drilling is temporarily suspended, non-noisy processing results generated while drilling may be identified. By identifying non-noisy processing results and utilizing these processing results when generating formation representative logs, the examples described herein substantially avoid the inclusion of processing results that are non-representative of the formation due to noise when generating such logs, for example.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A drillstring, comprising:
a bottom hole assembly coupled into the drillstring and comprising:
a measurement device configured to measure one or more parameters associated with a subterranean formation during a first time interval while drilling and one or more parameters associated with the subterranean formation during a second time interval while drilling is suspended; and
a processor to process the one or more measured parameters measured during the first time interval to generate first results and process the one or more measured parameters measured during the second time interval to generate second results using a processing parameter, the processor to implement a recursive filter to improve an accuracy of a log characterizing the subterranean formation based on the first results, the recursive filter to:

identify one or more slowness time coherence peaks in first portions of the first results as being associated with one or more slowness time coherence peaks in the second results;

identify second portions of the first results not associated with the one or more slowness time coherence peaks in the second results; and constrain effects of noise associated with the seconds portions of the first results on the characterization of the subterranean formation by modifying the second portions of the first results based on the second results, the processor to generate the log based on the second results and one or more of the first portions of the first results or the modified second portions of the first results.

2. The drillstring as defined in claim 1, wherein the processor is to update the processing parameter based on the second results.

3. The drillstring as defined in claim 1, wherein the recursive filter includes a Kalman filter.

4. The drillstring as defined in claim 1, wherein the processor is to generate the log by generating a first log based upon the first results, a second log based upon the second results, and a third log based on the modified second portions of the first results.

5. The drillstring as defined in claim 1, wherein the processing parameter includes one or more of a borehole diameter, a drilling fluid density, or a formation density.

6. The drillstring as defined in claim 1, wherein the recursive filter is to modify the second portions of the first results by predicting processing results for the first time interval based on the second results.

7. The drillstring as defined in claim 1, wherein the recursive filter is to predict processing results based on the second results for a third time interval occurring after the first time interval and after the second time interval.

* * * * *